United States Patent Office 3,812,081
Patented May 21, 1974

---

3,812,081
QUATERNARY AMMONIUM SALT CATALYST
William E. Dennis and George E. Vogel, Midland, Mich., assignors to Dow Corning Corporation, Midland, Mich.
No Drawing. Filed May 3, 1973, Ser. No. 357,044
Int. Cl. C08f *11/04*
U.S. Cl. 260—46.5 R                            6 Claims

ABSTRACT OF THE DISCLOSURE

Organosilicon resins containing silicon-bonded hydroxyl groups are cured by heating with quaternary ammonium salts of strong acids. This type of catalyst is latent in that there is little or no coasting or curing of the resin at room temperature and only slow curing under 100° C. For example, a molding compound based on a phenylmethyl silicone resin is cured by heating with benzyltriethyl ammonium chloride at a temperature of 170° C. The catalyzed resin has a shelf life of more than one year at room temperature.

---

It is known from U.S. Pat. No. 2,518,160 that quaternary ammonium hydroxides, quaternary ammonium acylates, and quaternary ammonium alkoxides can be used to cure silicone resins. The advantages taught in the patent for the use of these catalysts is that no metallic residue is left after the organosilicon resin has been cured. Catalysts used before these quaternary ammonium compounds were usually metal catalysts such as tin or lead acylates. After curing of the resin, the metal residue remains and tends to degrade the organosilicon resin at elevated temperatures, such as 200° to 250° C. With the quaternary ammonium compounds, however, no such residue remains and the high temperature heat aging qualities of the resin is improved. In spite of these desirable properties, the quaternary compounds of this patent have the disadvantage of promoting cure of the resin at room temperature. Thus, one cannot precatalyze a resin, put it in a package and have the resin remain in a usable condition over a prolonged period of time.

It is also known from U.S. Pat. No. 2,906,734 that the room temperature aging of the silicone resin can be prolonged if the quaternary ammonium acylate catalyst is buffered with a carboxylic acid having five or less carbon atoms. Whereas this does prolong the room temperature aging characteristics of the composition, this solution poses a serious difficulty in that the stabilizing agent is volatile and tends to evaporate from the resin composition upon standing. This is particularly detrimental when the resin composition is a dry mix such as silicone resin molding compounds.

Organosilicon resin molding compounds are widely employed in industry, particularly in the encapsulation of electronic devices. These materials are based upon solvent free hydroxyl-containing silicone resins and in the preparation of such molding compounds it is necessary to heat the resin above its melting point and then mill in the various fillers and other additives normally employed with molding compounds. In order to prepare a one package system, it is necessary to have a catalyst which is relatively inactive at the milling temperature, i.e. 100° C. in order to avoid ruining the flow characteristics of the molding compound.

It is the object of this invention to provide a catalyst for curing organosilicon resins which is inactive at room temperature and which therefore will permit prolonged storage of the organosilicon resin in excess of one year and will at the same time rapidly cure the resin when heated to temperatures of say 150° C. or above. Another object of this invention is to enable the hot milling of organosilicon molding compounds based on hydroxyl-containing resins without having any deleterious effect on the cure characteristics of the resin subsequent to compounding. All of these objectives are met by employing as catalyst the quaternary ammonium salts of the instant invention.

This invention relates to a composition consisting essentially of an organosilicon resin containing silicon-bonded hydroxyl groups and having on the average from 0.9 to 1.8 monovalent hydrocarbon or monovalent halohydrocarbon radicals per silicon atom and a catalytic amount sufficient to cure the resin of a quaternary ammonium salt of the formula $\{RR'_3N^+\}_n Y^-$ in which R is selected from the group consisting of monovalent hydrocarbon radicals, in which there are no carbon-carbon aliphatic multiple bonds attached to carbon atoms alpha or beta to the nitrogen, saturated hydroxy aliphatic hydrocarbon radicals, saturated hydroxy cycloaliphatic hydrocarbon radicals or $R''_3SiR'''$— radicals in which $R''$ is a monovalent hydrocarbon radical or an alkoxy radical and $R'''$ is a divalent hydrocarbon radical having no aliphatic carbon-carbon multiple bonds on the carbon atoms alpha or beta to the nitrogen, $n$ is 1 or 2, $R'$ is an aliphatic hydrocarbon radical or an aralkyl radical in both of which there are no carbon-carbon aliphatic multiple bonds on the carbon atoms alpha or beta to the nitrogen, $R'$ containing less than 10 carbon atoms, and $Y^-$ is $NO_3$, halogen having an atomic weight greater than 19, $SO_4$ or $OSO_2OR_4$ where $R_4$ is a lower alkyl radical.

The organosilicon resins employed in this invention are well known commercial materials and they can be any organosilicon resin having an average of from 0.9 to 1.8 hydrocarbon or halohydrocarbon radicals per silicon atom and which contain sufficient silicon-bonded hydroxyl groups (SiOH) to cause the resin to cure when heated with the catalysts defined herein. These resins can be homopolymers or copolymers and can contain 1 or more units of the structure $SiO_2$, $ZSiO_{3/2}$, $Z_2SiO$ and $Z_3SiO$ in such combinations that the ratio of Z groups to silicon falls within the above defined range. As is well known, the amount of silicon-bonded hydroxyl is not critical but generally in commercial organosilicon resins it ranges from .05 to 10 percent by weight and preferably from .1 to 8 percent by weight based on the weight of the resin.

For the purpose of this invention, Z can be any monovalent hydrocarbon radical such as alkyl radicals such as methyl, ethyl, isopropyl, t-butyl, octadecyl or myricyl; any alkenyl hydrocarbon radical such as vinyl, allyl, hexenyl, or methallyl; any alkynyl hydrocarbon radical such as ethynyl; any cycloaliphatic hydrocarbon radical such as cyclopentyl, cyclohexyl, cyclohexenyl, methylcyclopentyl or methylcyclohexenyl; any aryl hydrocarbon radical such as phenyl, naphthyl, xenyl, tolyl, or xylyl and any arakyl hydrocarbon radical such as benzyl, betaphenylethyl or omega-phenylpropyl. Z can also be any halohydrocarbon radical such as chloromethyl, chloroethyl, bromobutyl, chlorocyclohexyl, chlorophenyl, bromophenyl, 3,3,3-trifluoropropyl, alpha,alpha,alpha-trifluorotolyl, iodophenyl, chloroxenyl, bromonaphthyl, chlorooctadecyl or chlorovinyl.

As can be seen, the quaternary ammonium compounds employed in this invention are salts of quaternary ammonium hydroxides and strong acids, such as hydrochloric, hydrobromic, nitric, sulfuric, and the like. In spite of the fact that quaternary ammonium hydroxides, acylates and alkoxides have been known for over twenty years to be curing catalysts for organosilicon resins, it has not been known as far as applicants are able to ascertain that the corresponding salts of strong acids would be catalytic.

As can be seen, the quaternary ammonium compounds of this invention are of two general types, those in which R is a hydrocarbon or hydroxyhydrocarbon radical and those in which R is a silyl-substituted radical. R and R' can be any hydrocarbon radical except an aliphatic hydrocarbon radical having aliphatic multiple bonds, alpha or beta to the nitrogen. In other words, vinyl or allyl hydrocarbon radicals attached directly to the N atom are excluded from the compositions of this invention.

Otherwise R can be any monovalent hydrocarbon radical such as aliphatic hydrocarbon radicals such as methyl, ethyl, octadecyl, myricyl, hexenyl, octadecenyl, isopropyl or t-butyl; any cycloaliphatic hydrocarbon radical such as cyclopentyl, cyclohexyl, methylcyclohexyl, or cyclohexenyl; any aralkyl hydrocarbon radical such as benzyl, beta-phenylethyl or beta-phenylpropyl or any aromatic hydrocarbon radical such as phenyl, xenyl, naphthyl or anthracyl.

R can also be any hydroxylated aliphatic hydrocarbon radical such as beta-hydroxyethyl, beta-hydroxypropyl, beta-hydroxybutyl, omega-hydroxyoctadecyl or any hydroxylated cycloaliphatic hydrocarbon radical such as hydroxycyclohexyl or hydroxycyclopentyl.

In those cases where the quaternary ammonium compounds contain silicon atoms, R" can be the same hydrocarbon radicals as shown for R above including allyl and vinyl and in addition R" can be any alkoxy radical such as methoxy, ethoxy, octadecyloxy, isopropoxy, beta-methoxyethoxy or beta-ethoxyethoxy.

R''' can be any divalent hydrocarbon radical such as divalent aliphatic radicals such as methylene, dimethylene, trimethylene or octadecamethylene; any divalent cycloaliphatic hydrocarbon radical such as cyclohexylene, cyclopentylene or methylcyclohexylene; any aralkylene radicals such as —$C_6H_4CH_2$—, —$C_6H_4CH_2CH_2$—, —$(CH_2)_2C_6H_4(CH_2)_2$— or —$C_6H_4C_6H_4CH_2$— or any arylene radical such as phenylene, xylylene or naphthylene.

R' can be any aliphatic hydrocarbon radical or any aralkyl hydrocarbon radical both of less than 10 carbon atoms such as aliphatic radicals such as methyl, ethyl, isopropyl, butyl, octyl, hexenyl or octanyl or any aralkyl hydrocarbon radicals such as benzyl, beta-phenylethyl or gamma-phenylpropyl.

The anion Y' is the anion of strong acids such as the nitrate group or halogens such as chloride, bromide or iodide or the sulfate radical, i.e., $SO_4$ or an alkyl sulfate radical of the formula —$OSO_2OR_4$ in which $R_4$ is a lower alkyl radical, such as methyl, ethyl, propyl, or butyl.

For the purpose of this invention the proportions of catalyst to resin is not critical as long as there is sufficient catalyst to cure the resin to the desired extent and in the time required for the operation. Generally from 0.5 to 5 percent of the catalyst is sufficient. It should be understood, of course, that the rate of cure varies with the organosilicon resin being cured with the precise quaternary ammonium compound and with the temperature used. However, it is a simple matter to adjust the amount of catalyst relative to the rate of cure desired for any particular resin or catalyst system and for any particular temperature. Obviously the higher the temperature the faster is the cure.

The catalyst can be used in any applications in which organosilicon resins are used. That is, the catalyzed resins can be used in molding applications, laminating applications, as protective coatings, as release coatings or as water repellent coatings. The catalyst can also be used when the resin is in an organic solvent, is dispersed in water or is in a solvent and water free state.

The compositions of this invention can contain other additives normally employed with organosilicon resins such as fillers, such as carbon black, silica, glass, mica, diatomaceous earth, crushed quartz, metal oxides and the like.

The following examples are illustrative only and should not be construed as limiting the invention which is properly delineated in the appended claims.

EXAMPLE 1

This example compares the activity at room temperature and at 110° C. of the catalyst of this invention with quaternary ammonium butoxides and quaternary ammonium acylates.

The viscosity of the solution on aging was determined using a Brookfield viscometer (Model No. AAF), having a No. 3 spindle. The experiment in each case was continued until the viscosity of the solution became too thick to measure. This point was considered the gel point of the resin. In each experiment shown below, 1.5 percent by weight of the quaternary ammonium compound was added to 150 g. of an 80 percent solution of the organosilicon resin in xylene. The organosilicon resin employed was a copolymer of 45 mol percent monomethylsiloxane, 40 mol percent monophenylsiloxane, 5 mol percent phenylmethylsiloxane and 10 mol percent diphenylsiloxane which copolymer contains 6 percent by weight silicon-bonded hydroxyl groups. In each case the catalyzed resin solution was allowed to age at the temperature shown in the table below until the solution became too thick to measure. This was considered the end point and the time for this is recorded in each case.

TABLE

| Catalyst | Room temperature | 110° C. |
|---|---|---|
| Benzyltriethyl ammonium butoxide | 95 minutes | <1 minute. |
| Benzyltriethyl ammonium 2-ethyl-hexoate. | 7 days | 2 minutes. |
| Benzyltriethyl ammonium chloride | 1 month [1] | 65 minutes. |

[1] Had not gelled.

The above data indicates that the benzyltriethyl ammonium chloride is much less active at room temperature than the butoxide or the acylate in that the resin is sufficiently inactive even at 110° C. to enable compounding of the resin with filler and other ingredients at a temperature of say 100° C. without gelling the resin.

EXAMPLE 2

This example shows the use of the catalyst of this invention in a typical organosilicon molding compound and also the shelf stability of that compound after aging for 10 months. Resin 1 employed herein is identical of that of Example 1. Resin 2 contained 1.5 percent silicon-bonded hydroxyls and was a block copolymer of monophenylsiloxane blocks and dimethylsiloxane blocks containing a small amount of phenylmethylsiloxane units in the proportion of 60 mol percent dimethylsiloxane, 36 mol percent monophenylsiloxane, and 4 mol percent phenylmethylsiloxane. The molding compound had the following composition: 150 parts by weight of resin 1, 50 parts by weight resin 2, 240 parts by weight of glass fiber, 354 parts by weight of crushed silica, 4 parts by weight of black metal oxide pigment, 2 parts by weight calcium stearate, and 1.5 parts by weight of benzyl triethyl ammonium chloride catalyst.

The composition was prepared by melting the two resins on a mill and adding the catalyst to the resin mass. After milling for 5 minutes, the other ingredients were added and thoroughly milled in the resin until the mass was uniform. This molding compound was then checked in a Hull Spiral Flow Mold by filling the mold cavity, heating at 177° C. at 800 p.s.i. for 3 minutes. The composition melted and flowed through the mold for a distance of 30 to 36 inches before it solidified. This shows that the composition had sufficient flow to be commercially suitable as a transfer molding resin for the coating of electronic or other devices.

Additional samples of the composition were molded into tensile bars for 5 minutes at 177° C. under a pressure of 400 to 800 p.s.i. Each of the specimens was then heat-aged two hours at 200° C. Each specimen was then allowed to stabilize 8 hours at room temperature before testing. The samples had the following properties: flex strength, 10,400 p.s.i. and a flex modulus, 1.5 x 10⁶ p.s.i. The weight loss of the molded material after 100 hours at 250° C. was only 1.79 percent and the shrinkage after the same conditions was 0.18 percent. The specimens had excellent electrical properties as shown by dielectric strength and dissipation factor.

A sample of the compounded material was allowed to age at room temperature for 10 months and then was checked for flow in the Hull Spiral Flow under the conditions shown above. The flow was 21 inches. This shows that the composition was still suitable for transfer molding operations.

EXAMPLE 3

This example shows the efficacy as a curing catalyst of various quaternary ammonium halides of this invention. In each case, the resin employed was that of Example 1. The solid resin was placed in an aluminum weighing dish and heated to 160° C. One part by weight of each of the quaternary ammonium compounds shown below was added and the resin in each case showed a satisfactory cure.

The quaternary ammonium compounds employed were: tetramethyl ammonium chloride, tetraethyl ammonium chloride, tetrabutyl ammonium chloride, tetra-n-heptyl ammonium chloride, triethyl methyl ammonium chloride, gamma-(methyldimethoxysilyl)propyl trimethyl ammonium chloride, gamma-(trimethoxysilyl)propyl dimethyl beta-hydroxyethyl ammonium chloride, phenyl trimethyl ammonium chloride, benzyl trimethyl ammonium chloride, benzyl dimethyl octadecyl ammonium chloride, gamma-(trimethoxysilyl)propyl benzyl dimethyl ammonium chloride, octadecyl trimethyl ammonium iodide, benzyl trimethyl ammonium bromide, and lauryl trimethyl ammonium chloride.

EXAMPLE 4

One part by weight of the following quaternary ammonium compounds were added to the resin of Example 1 and excellent cure was obtained by heating at 160° C. The compounds were: triethyl methyl ammonium methylsulfate, benzyl triethyl ammonium bromide and beta-(trimethoxysilyl)propyl triethyl ammonium iodide.

EXAMPLE 5

The resin employed in this example was a copolymer of 26.3 mol percent monophenylsiloxane, 64.7 mol percent monomethylsiloxane, and 9 mol percent diphenylsiloxane and contained 0.2 percent by weight silicon-bonded hydroxyl groups. Two parts by weight of benzyl triethyl ammonium chloride was added to this resin and heated 3 minutes at 175° C. to give an excellent cure of the resin.

EXAMPLE 6

200 g. of the resin of Example 1, 590 g. of crushed quartz, 8 g. of black metal oxide pigment, 2 g. of calcium stearate, and 1 g. of benzyl triethyl ammonium chloride were mixed on a mill at 100° C. until a uniform mixture was obtained. The resulting compound was then cooled and subsequently molded as in Example 2 and exhibited a flow of 20 inches. This material had excellent moldability.

EXAMPLE 7

Curing of the following resins containing silicon-bonded hydroxyl groups is obtained when they are heated at 150° C. with 3 parts by weight of benzyl triethyl ammonium chloride. The proportion of siloxane is in mol percent:

15% $CH_3SiO_{3/2}$, 35% $C_2H_5SiO_{3/2}$ and 50% $C_4H_9SiO_{3/2}$.
10% $C_{18}H_{37}SiO_{3/2}$, 30% $(CH_3)_2SiO$, 45% $C_6H_5SiO_{3/2}$ and 15% $C_2H_3SiO_{3/2}$.
70% $CF_3CH_2CH_2SiO_{3/2}$ and 30% $CF_3CH_2CH_2(CH_3)SiO$.
10% $C_6H_5C_6H_4SiO_{3/2}$, 40% $CH_3C_6H_4SiO_{3/2}$ and 50% $C_6H_5(CH_3)SiO$.
10% $SiO_2$, 5% $(CH_3)_3SiO_{1/2}$, 65% $CH_3SiO_{3/2}$ and 20% $C_6H_5SiO_{3/2}$.
10% $C_6H_{11}SiO_{3/2}$, 20% $Cl_2C_6H_3SiO_{3/2}$, 30% $C_3H_5SiO_{3/2}$ and 40% $(CH_3)_2SiO$.

EXAMPLE 8

The resin of Example 1 is cured by heating with 2 parts by weight of the following quaternary ammonium compounds at 150° C.:

hydroxycyclohexyl trimethyl ammonium chloride,
phenyldiethoxysilylmethyl diethyl butyl ammonium butyl sulfate,
p-(vinyl dimethyl silyl)phenyl triethyl ammonium chloride,
di-(benzyl triethyl ammonium)sulfate,
tetraethyl ammonium nitrate,
cyclohexyl triethyl ammonium chloride,
xenyl triethyl ammonium chloride,
octadecenyl triethyl ammonium chloride,
cyclohexenyl benzyl dimethyl ammonium chloride, and
gamma-(tris-[beta-methoxyethoxy]silyl)propyl triethyl ammonium chloride.

That which is claimed is:

1. A composition of matter consisting essentially of an organopolysiloxane resin containing silicon-bonded hydroxyl groups and having on the average from 0.9 to 1.8 monovalent hydrocarbon or monovalent halohydrocarbon radicals per silicon atom and a catalytic amount of a quaternary ammonium compound of the formula $$\{RR'_3N^+\}_nY^-$$

in which R is selected from the group consisting of monovalent hydrocarbon radicals, in which there is no carbon-carbon aliphatic multiple bonds attached to carbon atoms alpha or beta to the nitrogen, saturated hydroxy aliphatic hydrocarbon radicals, saturated hydroxy cycloaliphatic hydrocarbon radicals, and $R''_3SIR'''$— radicals in which R'' is selected from the group consisting of monovalent hydrocarbon radicals or alkoxy radicals and R''' is a divalent hydrocarbon radical having no carbon-carbon aliphatic multiple bonds on the carbon atoms alpha or beta to the N, $n$ is 1 or 2, R' contains less than 10 carbon atoms and is selected from the group consisting of aliphatic hydrocarbon radicals or aralkyl hydrocarbon radicals in both of which there are no carbon-carbon aliphatic multiple bonds on the carbon atoms alpha or beta to the nitrogen, and $Y^-$ is selected from the group consisting of $NO_3$, halogen having an atomic weight greater than 19, $SO_4$, or $OSO_2OR_4$ where $R_4$ is a lower alkyl radical.

2. A composition in accordance with claim 1 in which the organosilicon resin is a methylphenyl organosilicon resin.

3. A composition in accordance with claim 2 in which the quaternary ammonium compound is benzyltriethyl ammonium chloride.

4. The method comprising heating the composition of claim 1 at a temperature sufficient to cure the resin.

5. The method comprising heating the composition of claim 2 at a temperature sufficient to cure the resin.

6. The method comprising heating the composition of claim 3 at a temperature sufficient to cure the resin.

References Cited

UNITED STATES PATENTS 2,518,160  8/1950  Mathes  260—465 R

MELVIN I. MARQUIS, Primary Examiner

U.S. Cl. X.R.

260—37 SB, 46.5 G